Aug. 19, 1947.　　　　J. R. BOYKIN　　　　2,425,987
CIRCUIT FOR MEASURING MINIMUM VALUES
OF UNIDIRECTIONAL VOLTAGE PULSES
Filed Sept. 10, 1943
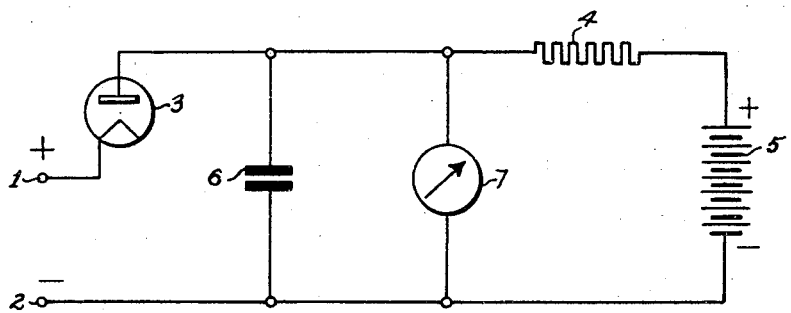
WITNESSES:
INVENTOR
John R. Boykin.
BY
ATTORNEY Patented Aug. 19, 1947

2,425,987

UNITED STATES PATENT OFFICE 2,425,987

CIRCUIT FOR MEASURING MINIMUM VALUES OF UNIDIRECTIONAL VOLTAGE PULSES

John R. Boykin, Baltimore, Md., assignor to Westinghouse Electric Corporation, East Pittsburgh, Pa., a corporation of Pennsylvania Application September 10, 1943, Serial No. 501,777

4 Claims. (Cl. 171—95)

My invention relates to voltage measuring instruments and in particular to instruments adapted to measure the peak minimum values of periodic voltages.

In electrical practice, for example, in the output circuit of class C radio amplifiers, it is desired at times to measure the minimum instantaneous value occurring at the trough of a direct current voltage pulsating at any frequency, radio, audio, or other. For example there are met periodic voltages in which the minima of successive periods vary up and down in accordance with some modulation of the carrier periodic voltage. Thus, ordinary speech modulation impressed on the input of a class C radio amplifier will cause the flow of plate current in the output circuit which will produce a periodic voltage between the anode and cathode which substantially never sinks to zero but which has successive minima which vary from period to period. It is desirable to have some instrument much simpler than an oscillograph capable of tracing the instantaneous variations of this output voltage which shall indicate at any time the value, at least approximately, of the lowest value characterizing any of the successive periodical minima. Such information is useful, for example, to tell the extent to which the available output voltage of the amplifier is being modulated. My invention described below comprises such an instrument.

One object of my invention is, accordingly, to provide a voltmeter which shall register the minimum value reached within a predetermined period of time by a periodically fluctuating voltage.

Another object of my invention is to provide means for measuring the minimum value attained within a predetermined time by a fluctuating unidirectional voltage.

Another object of my invention is to provide a relatively simple and inexpensive instrument for indicating approximately the degree to which the output voltage of a class C amplifier is being modulated by a signal impressed on its input circuit.

Other objects of my invention will become apparent upon reading the following description taken in connection with the drawings in which the single figure is a diagrammatic showing of a circuit embodying the principles of my invention.

Referring in detail to the drawing, a periodically fluctuating voltage, the successive minima of which are undergoing variation, is impressed across the terminals 1, 2, such voltage being the quantity whose minimum value is to be determined. The terminal 1, which is preferably normally positive relative to the terminal 2, is connected to the cathode of a rectifier 3 which may, for example, be a diode of a type conventional in the electrical art. The anode terminal of the rectifier 3 is connected through a resistor 4 to the positive terminal of a voltage source 5 which preferably has a value greater than the maximum value attained by the terminal 1 relative to the terminal 2. The negative terminal of the voltage source 5 is connected to the terminal 2. A capacitor 6, shunted by a voltage indicating device 7, is connected between the anode of the rectifier 3 and the terminal 2. The resistance 4 preferably has a value greatly in excess of that of the rectifier 3 and the resistance of the rectifier 3 is preferably small enough so that the time constant of the channel comprising it and the capacitor 6 is small relative to the time constant of mechanical oscillation of the needle of voltmeter 7.

The output voltage of a class C amplifier is of pulsating unidirectional type, the troughs of the pulsations falling at equal distances above the line of zero voltage at times when no modulation is being impressed on the amplifier input. The meter 7 will be seen to indicate the value of this trough voltage.

When a class C amplifier is being impressed with modulated signals, the successive minima of its plate circuit voltage, as explained above, vary from time to time and through a considerable range of values in the course of a transmission of a message lasting for let us say several, or many minutes. Theoretically, there would be during the course of these many minutes presumably but one minimum value which was lower than any other; but a knowledge of this is, in general, not particularly interesting to the operator of the amplifier. What the latter is more interested in is a measurement at any instant of the lowest minimum which occurs during the preceding interval of the order of say a second, as distinct from the intervals of the order of some microseconds which will separate successive minima of the amplifier output voltage. With this in mind the voltage measuring instrument 7 is provided with a needle or other indicator which has a time period of the order of a substantial fraction of a second. The resistance of the meter 7 is made so high that it dissipates only a negligible fraction of the charge of the capacitor 6 during the previously mentioned period of the order of one second.

With the arrangement described in accordance with the foregoing, the deflection of the meter 7, at any instant, will essentially correspond to the lowest minimum reached by the voltage impressed across the terminals 1, 2 within a preceding time of one second or so.

To give a specific example, I have made measurements on a class C amplifier of the type known to the trade as an 833 tube with a voltage supply 5 of 400 volts, a resistor 4 of 20 megohms, a capacitor 6 of one quarter microfarad, the meter 7, an electrostatic voltmeter and the rectifier 3 comprising a tube of the type known to the trade as 2V3-G.

While I have described a specific embodiment of the principles of my invention in accordance with the requirements of the patent statutes, it will be understood that these principles are of broader application in ways which will be apparent to those skilled in the art.

I claim as my invention:

1. Voltage measuring apparatus comprising a direct-current source having a resistor connected in a lead from one of its terminals, the remote end of said resistor being connected to the other terminal of said source through a capacitor shunted by a voltage-indicating device, terminals providing connections for a direct-current voltage to be measured, and leads between the last-mentioned terminals and the respective sides of said capacitor, one of said leads including a rectifier so poled as to permit said capacitor to discharge through the last-mentioned terminals.

2. Voltage measuring apparatus comprising a source of constant potential and a resistor in series, a lead extending from each end of the series, a capacitor shunted by a voltage measuring instrument connected between the leads, a rectifier having its anode connected to the positive lead, a terminal connected to the cathode of the rectifier and a terminal connected to the negative lead of the potential source.

3. Voltage measuring apparatus comprising a direct-current source having a resistor connected in a lead from one of its terminals, the remote end of said resistor being connected to the other terminal of said source through a capacitor shunted by a voltage indicating device having a movable element, terminals providing connections for a direct-current voltage to be measured, leads between the last-mentioned terminals and the respective sides of said capacitor, one of said leads including a rectifier so poled as to permit said capacitor to discharge through the last-mentioned terminals, the electrical time constant of the circuit comprising said capacitor and said terminals being small compared with the mechanical time constant of the movable element of said voltage indicating device.

4. Voltage measuring apparatus comprising a direct-current source having a resistor connected in a lead from one of its terminals, the remote end of said resistor being connected to the other end of said source through a capacitor shunted by a voltage indicating device, positive and negative terminals respectively providing connections for a direct-current voltage to be measured, leads between said positive and negative terminals and the respective sides of said capacitor which are of corresponding polarity, one of said leads including a rectifier so poled as to permit said capacitor to discharge through said positive and negative terminals.

JOHN R. BOYKIN.

REFERENCES CITED

The following references are of record in the file of this patent:

UNITED STATES PATENTS

| Number | Name | Date |
| --- | --- | --- |
| 1,966,047 | Ryall | July 10, 1934 |
| 2,014,102 | Conklin | Sept. 10, 1935 |
| 2,039,267 | Barber | Apr. 28, 1936 |
| 2,077,833 | Gieringer | Apr. 20, 1937 |

FOREIGN PATENTS

| Number | Country | Date |
| --- | --- | --- |
| 669,086 | Germany | Dec. 16, 1938 |